Nov. 26, 1940.　　　　　J. J. MAXON　　　　　2,223,292
SHUT-OFF VALVE
Filed May 25, 1938　　　2 Sheets-Sheet 1

INVENTOR
JOHN J. MAXON
BY
ATTORNEY.

Nov. 26, 1940.  J. J. MAXON  2,223,292
SHUT-OFF VALVE
Filed May 25, 1938  2 Sheets-Sheet 2
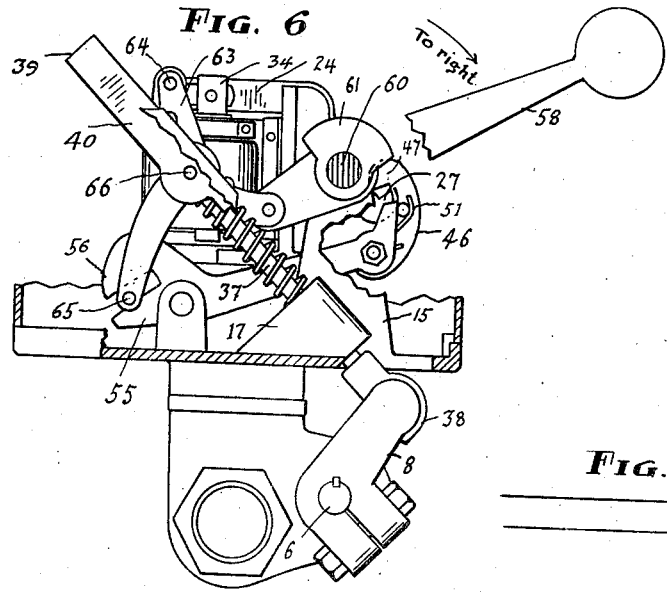
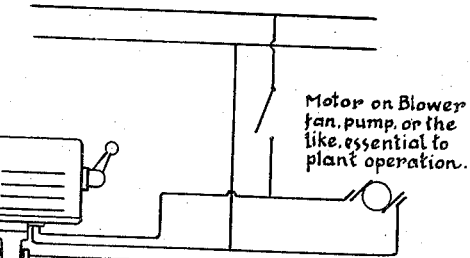
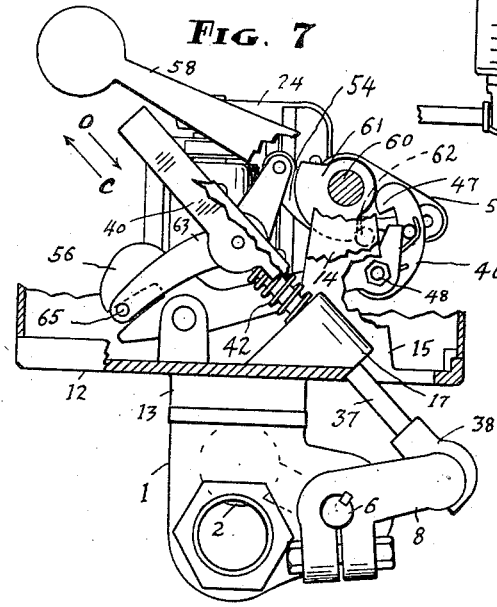
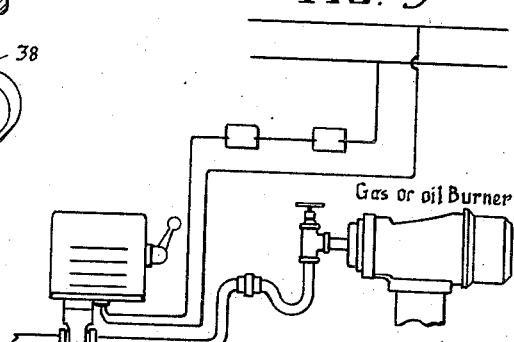
INVENTOR
JOHN J. MAXON
BY
Thomas L Ryan
ATTORNEY.

Patented Nov. 26, 1940

2,223,292

UNITED STATES PATENT OFFICE 2,223,292

SHUT-OFF VALVE

John J. Maxon, Muncie, Ind., assignor to Maxon Premix Burner Company, Muncie, Ind., a corporation Application May 25, 1938, Serial No. 210,087

12 Claims. (Cl. 137—139)

In the operating of industrial plants whose mechanical organizations are necessarily coordinated with and are dependent upon a moving supply of fluid such as gas, water, oil, or the like, it is of utmost importance that the flow of such fluid should be safely controlled; experience having shown that in case of interruption of the operation of the plant machinery, if the flow of such fluid is not immediately stopped, or if, after such flow will have been stopped, it may prematurely be resumed, there is immediate derangement of plant operation. The inconvenience and loss incident to such an event is especially serious in plants wherein electric motor driven equipment such as blowers, fans, pumps, burners and conveyors essential to such plant operation, are employed.

To overcome the above named disadvantages, my invention contemplates the providing for use in connection with the fluid conducting pipe forming part of the plant organization, a safety control mechanism comprising a valve, and electrically influenced means so combined and coordinated therewith, that whereas the valve is manually operable to close position while the circuit is closed, it automatically is moved to and it automatically is stayed against being moved from said closed position, in case the electric circuit is opened; and it is automatically so stayed against being moved from said closed position during such time as the said electric circuit remains open.

My invention is typified and embodied in, and its objects are accomplished by the new construction, combination and arrangement of parts described in the following specification and illustrated in the accompanying drawings. The different parts of the invention are identified by suitable characters of reference applied to them in the several views in the drawings, in which—

Figure 6 is a view similar to Figure 4, the several movable parts however being in the positions to which they will have been changed, when the reset lever will have been swung to the right.

Figure 7 is a view similar to Figure 4, the several movable parts however being in the positions to which they will have been changed when the reset lever will have been swung from the right hand position, to the left hand position.

Figure 8 is a diagrammatic view illustrating the wiring arrangement in connection with and typical of installation involving motor-driven machines essential to plant operation.

Figure 9 is a diagrammatic view illustrating the wiring arrangement typical of an installation involving gas or oil burners or the like.

Figure 1:
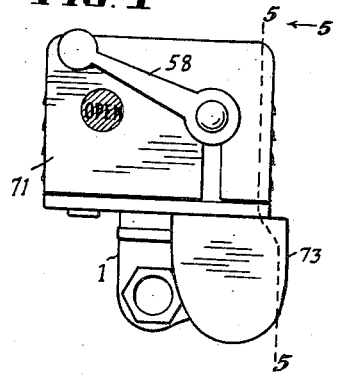
Figure 1 is a front view of my new safety shut-off valve mechanism.

A valve device of the kind preferred for use in the present embodiment of my invention is of the throttle type, consisting of the conventional body structure 1 within which is the gate 2 coordinated with the journaled stem 6 which is movable between the opened position and the closed position, by the rotative movement of the latter. 7 designates a usual packing box arrangement, and secured to the said stem 6 is a bell crank 8 which is provided with wrist pin 9. A substantial metal plate 12 which embodies a boss 13 that is secured to the body structure of said valve device, as by being screwed securely to a shoulder of the latter, constitutes a frame. Integrated with this frame plate are spaced pillow blocks 14 and 15, spaced pillow blocks 16, and a diagonal guideway block 17.

Secured to the top of the boss 13 of the said frame, is an upright 18 having a central slot 19 in its upper portion. Supported at the side of said upright is an electromagnetic device including coil 20 and its terminals 21 and 22, and the core 23. Conductors (not shown) are passed through aperture 28 provided therefor.

Figure 3:
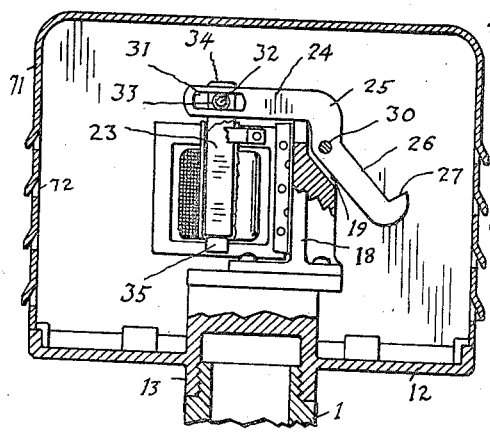
Figure 3 is a vertical cross section view taken on the broken line 3—3, and in the direction of arrow 3 in Figure 2.

A member which I designate as a trigger or lock dog consists of a flat metal piece embodying a horizontal arm 24, upright elbow 25 and diagonal arm 26 having claw 27. It is journaled at the lower portion of its elbow on a cross pin 30 that is retained by said upright. In a slot 31 which is provided in the free end of the said horizontal portion of the said lock dog member, is received a cross pin 32 upon which is journaled a roller 33. The ends of this cross pin are secured to the extended cheeks 34 of the said core. The said core 23, by force of gravity rests at the normal position shown, on the cross plate 35 provided therefor, the said lock dog accordingly being yieldably maintained at the given position shown in the drawings, reference being had to Figure 3.

A reach rod 37 which is slidingly retained in the diagonal guideway block 17, is articulated with the wrist pin of the bell crank 8, as by an open connector head 38. A cross head 39 which is secured to the upper end of said reach rod embodies spaced parallel side arms 40 and 41. A stout helical spring 42 threaded on said reach rod, and whose ends abut against the said guideway block and the underside of the cross head 39, urges the reach rod in the direction of the arrow C, the valve stem 6 being moved rotatively and the valve gate 2 being thereby moved to, and being held in the closed position. Carried on the side arm 40 of the said cross head 39, is an indicator plate 43 upon which appear legends —Open— and —Closed— and to which reference will presently be made.

Figure 4:
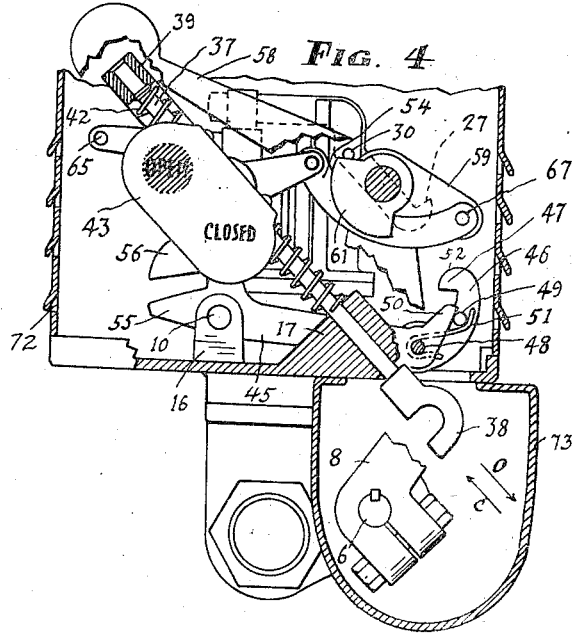
Figure 4 is a vertical cross section view taken on the broken line 4—4, and in the direction of arrow 4 in Figure 2.

Fulcrumed on a cross pin 10 retained in the pillow blocks 16 is a member which I designate as a latch pawl 45. Its elongated arm is normally in the lowered position shown with its free end resting on the frame plate as shown in Figure 4. A catch 46 which is of the formation as depicted in the drawings, and which embodies the hook 47 is pivotally retained on the end of said arm, as by cross pin 48. It is yieldingly held with its stud 49 against a projection 50 of the said arm, as by a spring 51.

Figure 2:
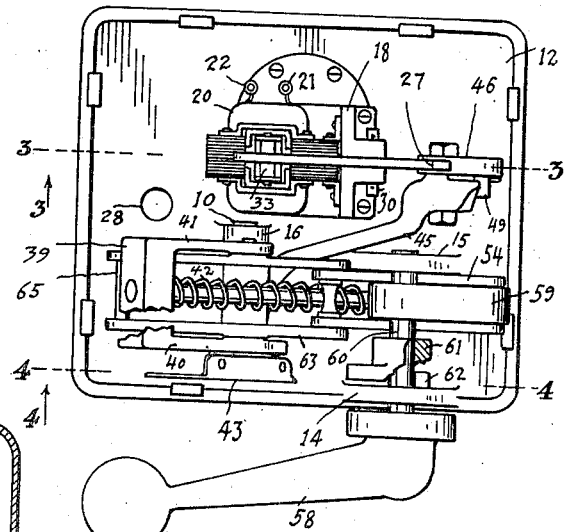
Figure 2 is a top plan view of Figure 1, enlarged, the top casing having been removed.
Figure 5:
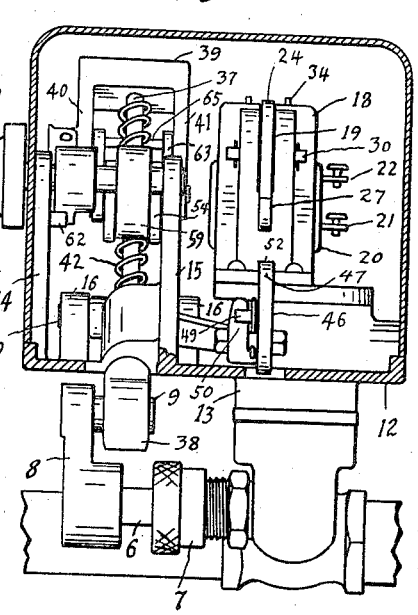
Figure 5 is a vertical cross section view, enlarged, taken on the broken line 5—5 and as seen in the direction of arrow 5 in Figure 1.

This latch pawl is of such formation in plan, as shown in Figure 2 that the catch 46 is in vertical alignment with the said latch dog, as shown in Figure 5. The said catch is so poised, that as the arm of the latch pawl rises, the lock dog (when the rounded face of its claw 27 is contacted by the rounded face 52 of the said catch) yields its position, and immediately after the catch will have passed, it returns automatically (by the gravitating action of the core) to its normal position, and engaged by the said catch. At such time as the lock dog is held against yielding (as will be presently referred to) the catch yields to permit of its being passed beyond the claw. The short arm portion of said latch pawl is of the formation as illustrated in Figure 4, the bifurcation thereof constituting a lower prong 55 and an upper prong 56.

Reset lever 58, with offset weight arm 59 has its fulcrum 60 journaled in the pillow blocks 14 and 15. A collar lug 61 is secured to said fulcrum shaft 60 at such position with relation to a stud 62 which is secured to the inner side of the pillow block 14, that the distance through which the reset lever is moved when it is swung to the left, is limited.

A draft arm 63 consists of similar side pieces retained in opposed order by cross bar 64 at their top ends, and by a knuckle pin 65 at their bottom ends. This draft arm, at a point intermediate its ends, is articulated, as by pivot pins 66, with the ends of the side arms 40—41 of the cross head 39 of the said reach rod.

Similar side pieces of curvate formation, as seen in Figure 4, are retained in spaced arrangement, their upper ends being journaled on the cross bar 64 and their lower ends being journaled on cross pin 67 of the weight arm of the said reset lever, and they constitute a connector member 54 between the reset lever and the said draft arm.

It will be observed that the above described draft member, and connector member are so related to each other, and to the cross head 39 of the said reach rod, that when the reset lever is at the primary or neutral point (see Figure 4) the knuckle pin 65 is at position removed from the said latch pawl.

The several working parts are enclosed by a suitable light sheet metal casing 71 having ventilatory slits 72; also a suitable casing at the underside of the frame plate, enclosing the exterior parts of the valve device. An aperture in the wall of the casing 71 is at position to disclose to view the legend —Open— when the reset lever is in the position indicated in Figure 7.

The invention is applicable to being embodied in form and dimensions for valves of all capacities. In the present instance the valve is for one inch iron pipe.

Installation of the invention involves simply the connecting of the pipes at the valve structure threads, and the connecting of the line wires at the terminals 21 and 22. The valve is in the closed position. The reset lever is in a neutral position, such as indicated in Figure 4.

The lock dog being yieldable until such time as the circuit is closed, any movement of the reset lever between its positions has no effect on the valve moving means, inasmuch as the catch 46 of the latch pawl passes into engagement with the claw 27 of the lock dog when the reset lever is swung to the right, and it yields and permits the latch pawl to drop, when the reset lever is swung to the left.

Typical installations of the invention are illustrated diagrammatically in Figure 8 and Figure 9.

Upon closing the circuit, the invention is operative. The energized electromagnet now holds the lock dog against yielding its given position. It will be assumed that the reset lever is in the position as indicated in Figure 4. Upon swinging it to right (see Figure 6) the wrist pin 65 of the draft arm, in its impingement at the lower prong 55 of the latch pawl raises the latter and the catch 46 engages the lock dog. (Reverse movement of the latch pawl at this stage is prevented by the prong 55 which is now engaged with the knuckle 65 of the draft arm.) Now, upon moving left of the reset lever (see Figure 7), the wrist pin 65 of the draft arm, impinging as it does, against the upper prong 56 of the latch pawl, and which said prong now acts as a fulcrum, the said draft arm pulls the reach rod 37 in the direction of arrow O, the valve thereby being moved to open position. The collar lug 61 will have come to engagement with the stud 62 and the connector link 54 will have passed dead center thereby checking reset lever against reverse.

The latch pawl being immovable so long as the circuit remains closed, it is obvious that the valve moving means likewise is held immovable, the valve being stayed in the open position. Manipulating of the reset lever, while the latch pawl is so held as above described, has no effect other than that of moving the valve between its two positions, namely, open or closed. The latch pawl at this stage being unchangeable; movement of the draft arm being prevented, and the spring 42 being resisted, the valve is stayed securely in the open position, and the only energy required of the electromagnet is that of simply staying the lock dog against movement.

In case of interruption of the current of the circuit due to any cause, there is the de-energizing of the electromagnet. The lock dog now yielding its position (incident to the downward urge of the catch 46,) permits the catch to recede. Simultaneously with this receding of the said catch, the latch pawl becomes disengaged from the knuckle 65 and it drops to neutral position. The draft arm having been released and the spring 42 being unresisted, the mover means including the cross head and reach rod is shot in the direction of arrow C, the valve being accordingly moved to the closed position.

The parts will now have been returned to the initial positions as indicated in Figure 4, and they so remain as long as the circuit is open. During this period, manipulating of the reset lever is effective for no purpose other than that of moving it to the right its full stroke, causing the latch pawl to be raised to reset its catch 46 in engagement with the claw of the lock dog, as indicated in Figure 6.

The use of my improved safety shut-off valve mechanism, assures dependable protection against flow in the fluid supply pipe line, in case of derangement or break down of electrically operated equipment, and it is especially to be desired in plants where such equipment is essential to the plant operation. The amount of electrical energy used is extremely small and the mechanism in its entirety is not liable to become deranged or out of adjustment or repair. All of the working parts are enclosed; there is no possibility of the mover means being propped to position opening the valve, and unauthorized manipulating of the lever, while the current is off, is harmless.

Operating of the valve to locked open position is impossible until after the circuit will have been closed. The invention is a tell-tale as it snaps the valve to closed position the instant of interruption of flow of current.

It will be understood that minor changes and modifications may be made in the several parts and details of the invention, by those skilled in the art to which the invention appertains, without departing from the principle or spirit of the invention as same is defined in the appended claims, and that the invention is to be construed as of the scope so defined.

What I claim as my invention, is—

1. A safety shut-off valve apparatus, comprising a valve, means to automatically hold it yieldingly in the closed position, and which said means is operable to move the valve to open position, operating means to shift said valve holding means and to releasably to position opening the valve and to stay it in that position including electrically influenced means and devices interacting between the electrically influenced means and the said operating means the interacting devices being so constructed that while the electrically influenced means is energized, the operating means is effective to move the valve holding means to open position, and that while the electrically influenced means is deenergized, the operating means is ineffective to shift the valve holding means to valve open position.

2. A safety shut-off valve mechanism, comprising a valve, means to automatically hold the valve yieldingly in the closed position, mechanical means to move the valve holding means, electrically influenced means, an interacting member between said valve holding means and said electrically influenced means to render the mechanical means operable to shift the valve holding means to position opening the valve and to stay the valve holding means in that position when the electrically influenced means is energized, and which while the electrically influenced means is de-energized renders the said mechanical means ineffective to shift the valve holding means to valve opening position.

3. A mechanism of the kind described, comprising a valve, means to automatically hold it in the closed position, and which is operable to move the valve to open position, operating means to shift the said valve holding means to position opening the valve including a trigger retained yieldingly at a given position, electrically influenced means to stay the trigger against yielding, and a latching means cooperating with said operating means and the said trigger the arrangement being such that the operating means is incapable of shifting the valve holding means to valve opening position except when the electrically influenced means is energized and on de-energization the operating means is rendered ineffective to stay the valve holding means in position opening the valve.

4. A mechanism of the kind described, comprising a valve, mechanical means operable to a position opening the valve, and also operable to a position closing the valve, means to automatically urge said mechanical means to, and to stay it in the closed position, operating means to shift the said valve moving means to position opening the valve, including a holder device retained yieldingly in a given position, electrically influenced means to stay the holder device against yielding when energized, and a latching means cooperating with the said holder device and the said operating means the arrangement being such that the operating means is ineffective to shift the mechanical means except when the electrically influenced means is energized and the holder device yields its position rendering the mechanical means ineffective to stay the valve in valve opening position when said electrical means is de-energized.

5. A safety shut-off valve apparatus of the kind described, comprising a valve, a mover device therefor, means to urge the mover device to a position closing the valve and to stay the mover device in that position, a lock dog retained yieldingly in a given position, means electrically influenced to stay the lock dog, a latch pawl, a yieldable catch thereon, the said latch pawl being retained normally in retracted position and being operable therefrom to cause the catch to pass and to become engaged with the said lock dog, a reset lever movable between two positions, draft connections between the said reset lever and the said mover device, which are operable to engagement with and to actuate the said latch pawl when the reset lever is swung to one of its positions, and are operable to shift the mover device to position opening the valve when the reset lever is swung to its other position, and which said draft connections automatically become disengaged from said latch pawl when the electrically influenced means fails to hold the dog against yielding its position, whereby the latch pawl recedes, and the urger means shifts the mover device to position closing the said valve.

6. A safety shut-off valve mechanism of the kind described, comprising a valve, a mover device therefor, means to urge the mover device to position closing the valve and to stay the mover device in that position, a lock dog retained yieldingly in a given position, means electrically influenced to hold the lock dog against yielding its position, a draft member carried by the mover device, a reset lever mounted on the frame and which is movable between two positions, a power transmitting member between the reset lever and the said draft member, a latch device which is engageable by said draft member whereby the said latch member is moved to and is held in engaged relation with said lock dog when the reset lever is moved to one of its positions, and which said latch device is adapted to become disengaged from said draft member when the electrically influenced means fails to hold the lock dog in its given position.

7. A safety shut-off valve mechanism, comprising a valve, a mover device therefor, means to urge the mover device to position closing the valve and to stay it in that position, a lock dog retained yieldingly in a given position, means electrically influenced to hold the lock dog against yielding its given position, a draft member carried by the mover device, a reset lever mounted on the frame and which is movable between two positions, a power transmitting member interconnected with the reset lever and the said draft member and which functions to stay the said reset lever when the latter is moved to one of its positions, a latch device which is engageable by said draft member when the reset lever is moved to said position, whereby the said latch member will have been moved to engaged relation with said lock dog, and which said latch member is adapted to become disengaged from said draft member when the electrically influenced means fails to hold the said lock dog in its given position.

8. A safety shut-off mechanism, comprising a valve, a mover device therefor, a spring to urge the mover device to position closing the valve and to stay the mover device in that position, a lock dog retained yieldingly in a given position, an electromagnetic device the core thereof being articulated with said lock dog, a circuit, a draft member pivotally articulated intermediate its ends on the said mover device, a reset lever which is movable between two positions, a power transmitting member interconnected with one end of the draft member and the said reset lever and which is adapted to stay the latter when it is moved to one of its positions, a latch device which is engageable by the other end of said draft member when the reset lever is moved to said above named position, whereby the said latch device will have been moved to engaged relation with said lock dog, and which is adapted to become disengaged from said draft member when the said circuit is opened.

9. A safety shut-off mechanism, comprising a valve, a dog, an electro-magnet to hold the dog when energized and which permits the dog to yield its position when the former is deenergized, a holding means to yieldingly urge the valve to closed position and to hold it in that position and which also is operable to position opening the valve, operating means to shift the said valve holding means to position opening the valve and to stay said holding means in that position, the said operating means including a connector member adapted to be engaged and moved to engagement with the dog while the electro-magnet is energized, and which said connector member automatically becomes disengaged from said dog when the electro-magnet is deenergized, whereby the valve holding means is permitted to return to its position closing the valve and staying it in the closed position.

10. A mechanism of the kind described, including a valve, a device to automatically hold the valve yieldingly at closed position but which is capable of being shifted to position opening the valve, a dog which automatically reposes in a given position, electrically influenced means to hold the dog against yielding its position when energized, reset means to shift the valve holding device to position opening the valve and to stay said valve holding device in that position, including a normally static member which is adapted to be engaged by the reset means and moved to interacting relation with the said dog when the said reset means is actuated to shift the valve holding device, the arrangement being such that the reset means is incapable of shifting the holding device except when said electrically influenced means is energized and the interacting member becomes disengaged from said reset means and the latter is rendered ineffective to stay the valve holding device in valve opening position when the electrically influenced means becomes de-energized.

11. A mechanism of the kind described, comprising a valve, means to automatically hold the valve yieldingly at closed position and which said means is movable to position opening the valve, a dog supported in a given position and which is yieldable from said position, an electromagnet to hold the said dog against yielding its position while the electro-magnet is energized, a latch member poised in relation to and which is operable to engagement with said dog, and operating means effective to engage and to operate the latch and to hold it engaged with said dog, and to shift the valve holding means to position opening the valve and to stay said valve holding means at that position as long as the electro-magnet remains energized, but which said operating means upon the deenergization of the electro-magnet and the yielding of the dog becomes disengaged from said latch, the latch returning by gravity to its normal position, the valve holding means automatically moving to position closing the valve, and the said operating means being rendered inoperative to stay the valve holding means.

12. A shut-off and reset mechanism, comprising a valve, means to urge and to hold the valve yieldingly at closed position but which is movable to position opening the valve, a circuit, a dog supported by gravity at a given position, a magnet to hold the dog against yielding its said given position while the circuit is closed, a latch retained by gravity at poised relation to said dog and which is operable to raised position, a catch on said latch which is adapted to pass and then to interlock with said dog when the latch is raised, and a reset means operable to engage and to actuate the latch to raised position, and to shift said valve holding means to position opening the valve and to stay it in that position, but which said reset means, upon an opening of the circuit and the consequent yielding of the dog, becomes disengaged from the said latch, the latter becoming automatically free from the dog, and the said latch then receding to its normal position, the valve moving means being shot to and held in the position closing the valve, and said reset means being rendered incapable of actuation to stay the valve holding means so long as the circuit remains open.

JOHN J. MAXON.